Dec. 16, 1952   A. J. GETZ   2,621,942
WHEEL RAISING AND LOWERING MECHANISM FOR BOAT TRAILERS
Filed Sept. 14, 1950   2 SHEETS—SHEET 1
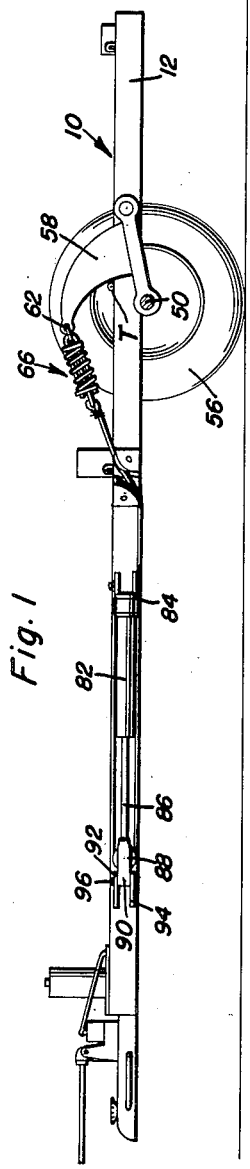
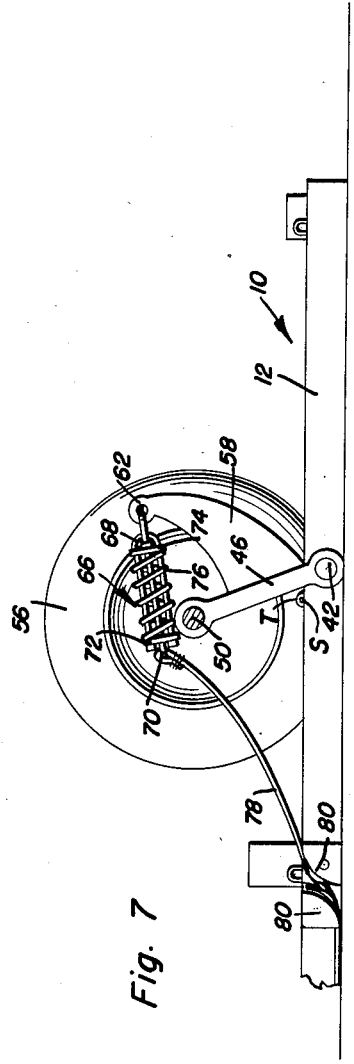
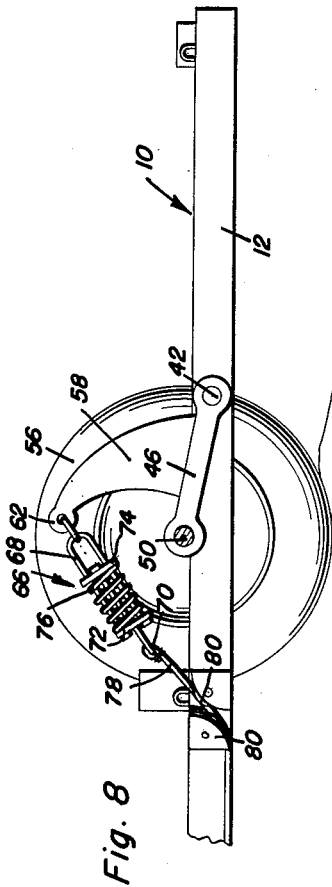
Inventor
Alfred J. Getz
By Clarence A. O'Brien
and Harvey B. Jacobson
Attorneys Dec. 16, 1952 A. J. GETZ 2,621,942
WHEEL RAISING AND LOWERING MECHANISM FOR BOAT TRAILERS
Filed Sept. 14, 1950 2 SHEETS—SHEET 2
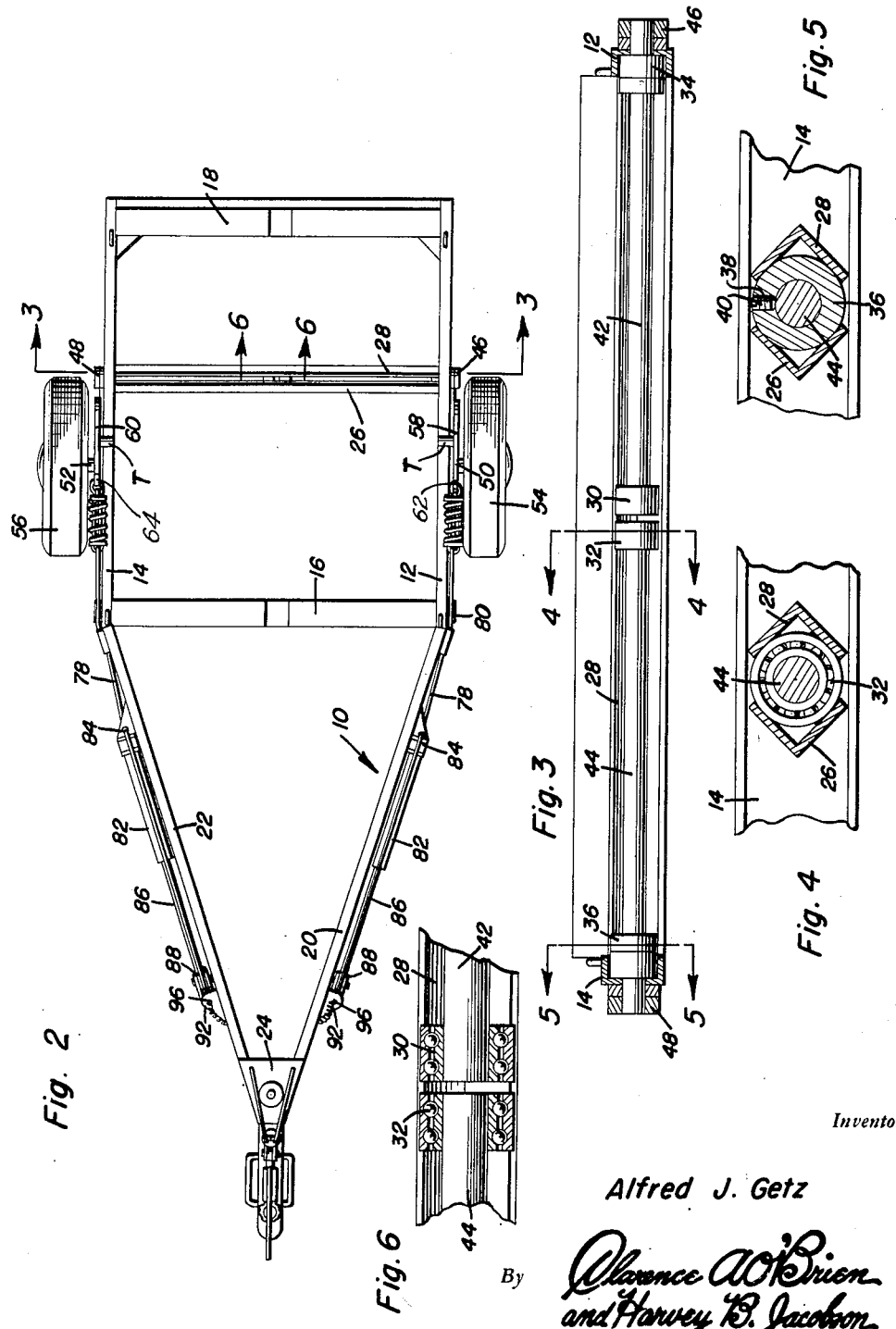
Inventor
Alfred J. Getz Patented Dec. 16, 1952

2,621,942

UNITED STATES PATENT OFFICE 2,621,942

WHEEL RAISING AND LOWERING MECHANISM FOR BOAT TRAILERS

Alfred J. Getz, Kalispell, Mont.

Application September 14, 1950, Serial No. 184,846

7 Claims. (Cl. 280—44)

This invention relates to new and useful improvements in trailers and the primary object of the present invention is to provide a boat trailer including a frame and wheel mountings on the frame whereby the frame may be selectively raised or lowered in a convenient manner.

Another very important object of the present invention is to provide a trailer for boats and the like including vertically swingable wheel mountings whereby the frame of the trailer may be raised or lowered together with a novel shock absorbing means applied to the mountings.

A further object of the present invention is the provision of a trailer that is so constructed as to permit articles to be quickly and readily applied to or removed from the trailer in a convenient manner and including a novel and improved axle construction that is adaptable for trailers of various widths.

A still further aim of the present invention is to provide a boat trailer that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the trailer the near wheel removed and its axle in section and showing the frame raised;

Figure 2 is a top plan view of Figure 1;

Figure 3 is an enlarged transverse vertical sectional view taken substantially on the plane of section line 3—3 of Figure 2;

Figure 4 is an enlarged detail vertical sectional view taken substantially on the plane of section line 4—4 of Figure 3;

Figure 5 is an enlarged detail vertical sectional view taken substantially on the plane of section line 5—5 of Figure 3;

Figure 6 is an enlarged detail vertical sectional view taken substantially on the plane of section line 6—6 of Figure 2;

Figure 7 is an enlarged fragmentary view of Figure 1 but showing the frame lowered for the loading or unloading of equipment on the frame; and, Figure 8 is an enlarged fragmentary view of Figure 1 to show the action of the shock absorbers as the wheels ride over uneven ground or bumps.

Referring now to the drawings in detail, wherein for the purpose of illustration, there is disclosed a preferred embodiment of the present invention, the numeral 10 represents a trailer frame including a pair of channel shaped side members 12 and 14 whose forward and rear ends are joined by forward and rear cross-beams 16 and 18. Forwardly converging draft beams 20 and 22 are secured to or form an integral part of the side members 12 and 14, and the forward ends of the beams 20 and 22 are connected by gussets or the like 24.

A pair of elongated, spaced parallel, angle-iron bars 26 and 28 are terminally fixed, by welding or the like, to the side members 12 and 14. The bars 26 and 28 face each other and form complemental and opposing V-shaped seats that receive ball-bearing-race assemblies 30 and 32 at their central portions. The ends of the bars 26 and 28 also receive bearings 34 and 36. The assemblies 30 and 32, and the bearings 34 and 36, are fixed to and within the bars 26 and 28 by welding or such other means for permanently attaching the assemblies and the bearings to the angle-iron bars. The bearings 34 and 36 are formed with internally threaded recess 38 that receivably engage plugs 40 which are removable to permit a lubricant to be fed into the bearings for axles rotatably supported in the bearings.

A first axle 42 is rotatably supported in the bearing 34 and the assembly 30 and a second axle 44 is rotatably supported in the bearing 36 and the assembly 32. The axles 42 and 44 are confined between the angle iron bars 26 and 28 to reinforce and strengthen the entire axle construction.

The outer ends of the axles 42 and 44 project outwardly from the side members 12 and 14, and support laterally projecting arms 46 and 48. Stub axles 50 and 52 are secured to and project outwardly from the outer ends of the arm 46, 48 and support wheels 54 and 56. The stub axles 50 and 52 parallel the axles 42 and 44.

Reinforcing and strengthening plates 58 and 60 are fixed by welding to the arms 46 and 48. The plates 58 and 60 are vertically disposed and they are shaped as shown in Figures 1, 7 and 8 to include aperture outer corners or eye portions 62 and 64.

A shock absorber or spring member 66 is associated with each of the plates 58, 60. The shock absorbers each include a pair of U-shaped bolts 68 and 70 to the ends of which are fixed plates 72 and 74. The plate 72 is slidable on the bolt 70 and the plate 74 is slidable on the bolt 68. A coil spring 76 embrace the bolts 68 and 70 and are biased between the plates 72 and 74 to yieldingly urge the plates 72, 74 apart and the members 68 and 70 from each other.

The bolts 68 are secured to the eyes 62, 64 and the bolts 70 are attached to the rear ends of cables 78. Guide rollers 80 mounted on the frame 10 slidably receive the cables 78.

Hydraulic rams or pumps 82 are pivotally mounted, as at 84, to the beams 20, 22 and include piston rods 86 that support pulleys 88 over which the cables 78 are trained. The forward ends of the cables 78 are anchored to the frame. As the rods 86 are extended forwardly, the cables 78 will pull the arms 46 and 48 upwardly to raise the frame whereas rearward movement of the rods 86 will effect a lowering of the arms 46 and the frame 10.

When the rods 86 have been extended to their correct position for raising the frame 10, vertical sleeves 90 carried by the rods 86 register with apertures in upper and lower plates 92 and 94 fixed to the beams 20, 22, and removable pins 96 are extended through the plates 92, 94 and the sleeves 90 to lock the rods 86 extended.

The springs 76 are not completely compressed when the frame is raised, therefore, as the wheels ride over the bump, as shown in Figure 8, the springs 76 will be compressed to reduce to a minimum the shock as the trailer is moved.

A laterally projecting stop pin S is mounted on each of the side members 12 to prevent complete lowering of the frame 10 while the trailer is in motion. The pins S are received in tubes T welded to the side members and are removable from the tubes T as the trailer frame is intentionally lowered. The pins S extend laterally from the side members a sufficient amount to be engaged by the arms 46, and the pins P may be spring urged from the tubes T whereby the pins may be manually forced into the tubes under certain circumstances, such as when the frame is to be completely lowered.

The hydraulic rams 82 are of any conventional type and may comprise hydraulic jacks that are presently available.

Having described the invention, what is claimed as new is:

1. A trailer comprising a frame including a pair of said members, a pair of elongated angle-iron bars terminally fixed to said side members, said bars being parallel and facing each other, a pair of ball race bearing assemblies fixed between the central portions of said bars, bearings fixed between and to the ends of said bars, a pair of axles rotatably supported in said bearing assemblies and said bearings and having outer ends, arms fixed to and projecting laterally from the outer ends of said axles, stub axles fixed to said arms and paralleling the first named axles, wheels on said stub axles, and means carried by the frame and connected to said arms for rotating the arms to selectively raise or lower the frame and including spring members attached to said arms.

2. A trailer comprising a frame including a pair of side members, a pair of elongated angle-iron bars terminally fixed to said side members, said bars being parallel and facing each other, a pair of ball race bearing assemblies fixed between the central portions of said bars, bearings fixed between and to the ends of said bars, a pair of axles rotatably supported in said bearing assemblies and said bearings and having outer ends, arms fixed to and projecting laterally from the outer ends of said axles, stub axles fixed to said arms and paralleling the first named axles, wheels on said stub axles, a vertical plate fixed to and projecting laterally from each arm, a spring means attached to each plate and lifting cords attached to the spring means for selectively raising and lowering the arms about the stub axles.

3. A trailer comprising a frame including a pair of side members, a pair of elongated angle-iron bars terminally fixed to said side members, said bars being parallel and facing each other, a pair of ball race bearing assemblies fixed between the central portions of said bars, bearings fixed between and to the ends of said bars, a pair of axles rotatably supported in said bearing assemblies and said bearings and having outer ends, arms fixed to and projecting laterally from the outer ends of said axles, stub axles fixed to said arms and paralleling the first named axles, wheels on said stub axles, a vertical plate fixed to and projecting laterally from each arm, a spring means attached to each plate and lifting cords attached to the spring means for selectively raising and lowering the arms about the stub axles wherein said plates include outer corners overlying said stub axles when the arms are raised, the outer corners of said plates supporting said spring means.

4. A trailer comprising a frame including a pair of side members, a pair of elongated spaced parallel angle-iron bars terminally secured to said side members and facing each other, a pair of ball bearing race assemblies secured within each of said bars and extending between the central portions of said bars, and bearings welded to and extending between the ends of said bars, a pair of axles rotatably supported in said assemblies and said end bearings, said axles including outer end portions extending outwardly from the side members, a pair of arms fixed to the outer end portions of said axles and projecting laterally from the axles, stub axles carried by said arms and paralleling said axles, wheels mounted on said stub axles, and hydraulically actuated means connected to said arms for selectively raising and lowering the arms and the frame.

5. A trailer comprising a frame including a pair of side members, a pair of elongated spaced parallel angle-iron bars terminally secured to said side members and facing each other, a pair of ball bearing race assemblies secured within each of said bars and extending between the central portions of said bars, end bearings welded to and extending between the ends of said bars, a pair of axles rotatably supported in said assemblies and said end bearings, said axles including outer end portions extending outwardly from the side members, a pair of arms fixed to the outer end portions of said axles and projecting laterally from the axles, stub axles carried by said arms and paralleling said axles, wheels mounted on said stub axles, and hydraulically actuated means connected to said arms for selectively raising and lowering the arms and the frame, said hydraulically actuated means including a pair oframs carried by said frame having piston rods, and flexible elements connecting said rods to said arms.

6. A trailer comprising a frame including a pair of side members, a pair of elongated spaced parallel angle-iron bars terminally secured to said side members and facing each other, a pair of ball bearing race assemblies secured within each of said bars and extending between the central portions of said bars, end bearings welded to and extending between the ends of said bars, a pair of axles rotatably supported in said assemblies and said end bearings, said axles including outer end portions extending outwardly from the side members, a pair of arms fixed to the outer end portions of said axles and projecting laterally from the axles, stub axles carried by said arms and paralleling said axles, wheels mounted on said stub axles, a pair of elongated plates fixed to said arms and including apertured apieces overlying said stub axles when the arms are raised, spring members attached to the apices of said plates, and means supported on the frame and connected to said spring members for selectively raising and lowering said arms and said frame.

7. A trailer comprising a frame including a pair of side members, a pair of elongated spaced parallel angle-iron bars terminally secured to said side members and facing each other, a pair of ball bearing race assemblies secured within each of said bars and extending between the central portions of said bars, end bearings welded to and extending between the ends of said bars, a pair of axles rotatably supported in said assemblies and said end bearings, said axles including outer end portions extending outwardly from the side members, a pair of arms fixed to the outer end portions of said axles and projecting laterally from the axles, stub axles carried by said arms and paralleling said axles, wheels mounted on said stub axles, a pair of elongated plates fixed to said arms and including apertured apices overlying said stub axles when the arms are raised, spring members attached to the apices of said plates, and means supported on the frame and connected to said spring members for selectively raising and lowering said arms and said frame, said means including a pair of cables attached to said spring members and said frame, a pair of slidable rods, pulleys carried by said rods, said cables being trained over said pulleys and means for locking the rods extended and the arms raised.

ALFRED J. GETZ.

REFERENCES CITED

The following references are of record in the file of this patent:

UNITED STATES PATENTS

| Number | Name | Date |
| --- | --- | --- |
| 2,227,762 | Ronning | Jan. 7, 1941 |
| 2,453,388 | Schramm | Nov. 9, 1948 |
| 2,487,701 | Getz | Nov. 8, 1949 |